United States Patent [19]
Chulick

[11] Patent Number: 5,974,653
[45] Date of Patent: Nov. 2, 1999

[54] METHOD OF FORMING A METALIC INTERMEDIATE QUASI-HALF ANNULI, USEFUL IN ASSOCIATION WITH FORMING A FULL ANNULUS ABOUT INSULATED PIPES AND RELATED EQUIPMENT

[76] Inventor: John C. Chulick, 5146 Mono Ct., Suisun, Calif. 94585

[21] Appl. No.: 08/664,637

[22] Filed: Jun. 17, 1996

[51] Int. Cl.⁶ ............................................. B23P 11/00
[52] U.S. Cl. ........................... 29/525.01; 138/96 R
[58] Field of Search ............... 29/525.01; 138/106, 138/107, 149, 157, 158, 96 R, 96 T, 171; 137/375; 83/50, 55, 684, 685, 686

[56] References Cited

U.S. PATENT DOCUMENTS

| | | | |
|---|---|---|---|
| 3,818,949 | 6/1974 | Johnson | 138/158 |
| 4,323,088 | 4/1982 | McClellan | 138/106 |
| 5,458,717 | 10/1995 | Kurita | 156/253 |

*Primary Examiner*—P. W. Echols
*Assistant Examiner*—John C. Hong
*Attorney, Agent, or Firm*—Harold D. Messner

[57] ABSTRACT

The invention provides for an intermediately formed quasi-half metallic annulus useful in constructing a full metallic annulus that can be mounted at the ends of insulated pipes and like equipment for weatherproofing purposes. Each quasi-half annulus includes (a) an arcuate side wall defined by a common radius originating along a longitudinal line of formation parallel to the side wall, (b) an end wall connected at one end of the side wall, (c) the side and end wall including an integrally formed corner for uniting them wherein the side wall has a rectangular opening parallel to the line of formation and an arcuate opening normal to the line of formation at an end opposite to the end wall. The rectangular opening is offset to a side of the line of formation in a direction opposite to the position of the side wall so that the combined area of the side and end walls is slightly greater that a conventional half annulus of similar shape and dimensions. Due to the invention, the side and/or end openings are also flexibly workable to permit entry within or without mating side and/or end openings of an another intermediate quasi-half annulus of similar construction. Result: a full annulus united along a U-shaped overlap region of common transverse and circumferential length W is easily formed, say for covering over an open side of insulation about pipes and associated equipment to protect same. A method of formation and usage is also described.

7 Claims, 4 Drawing Sheets

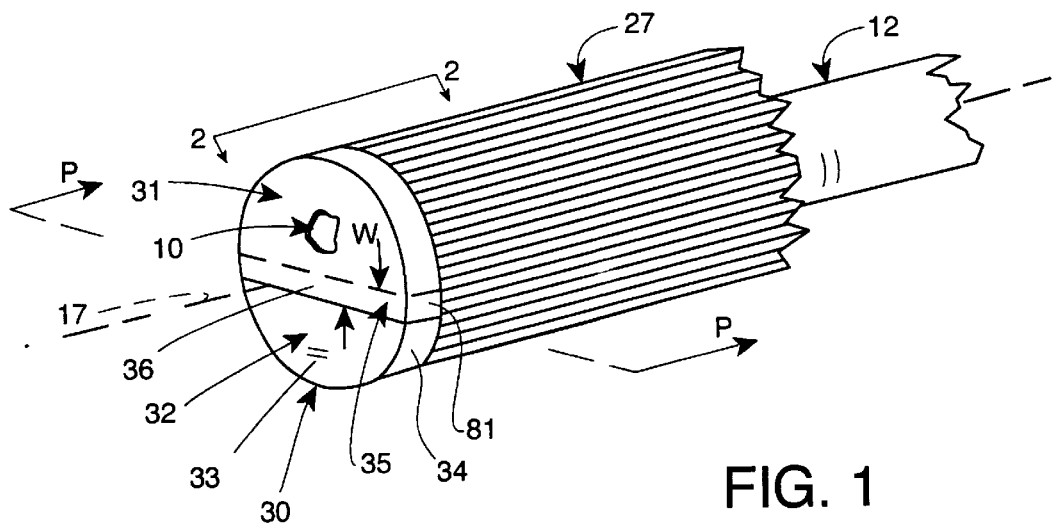
FIG. 1
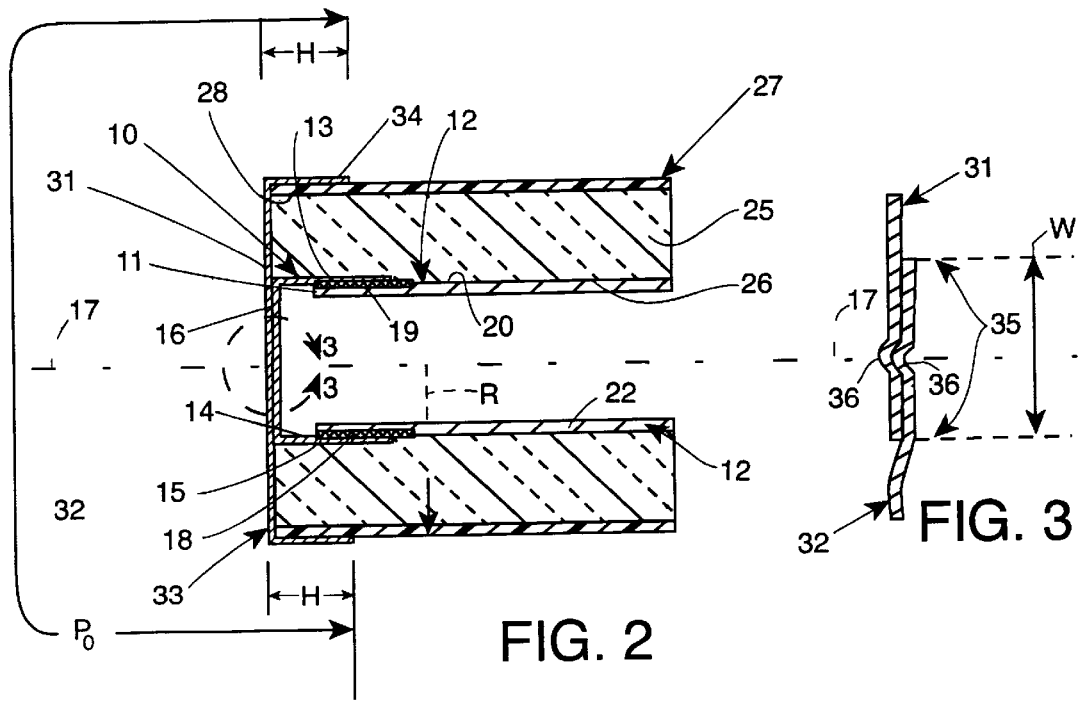
FIG. 2
FIG. 3

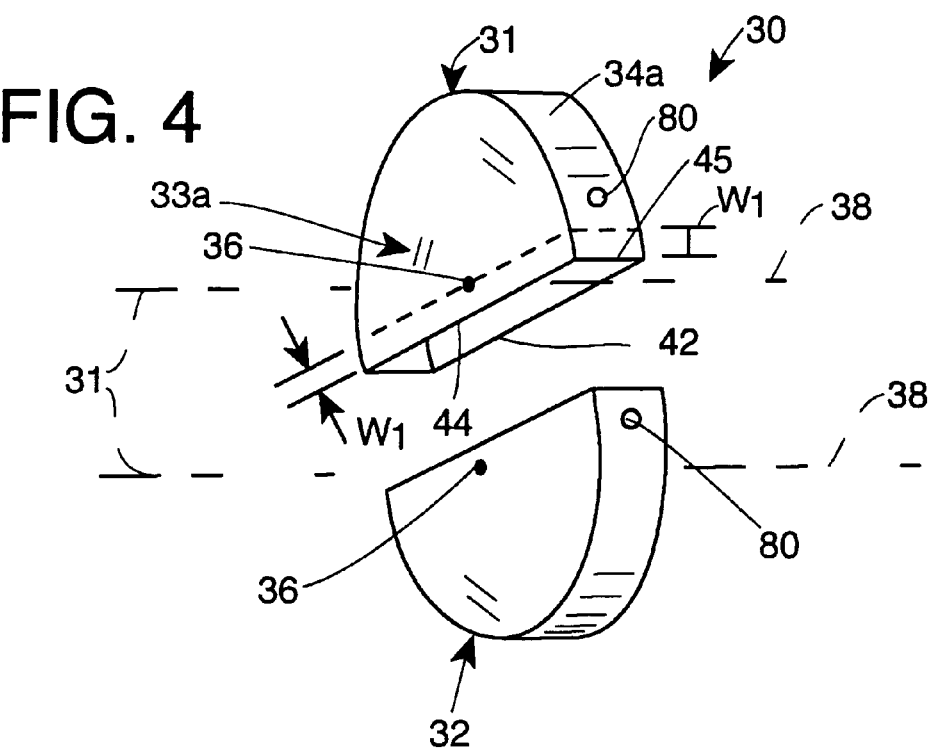
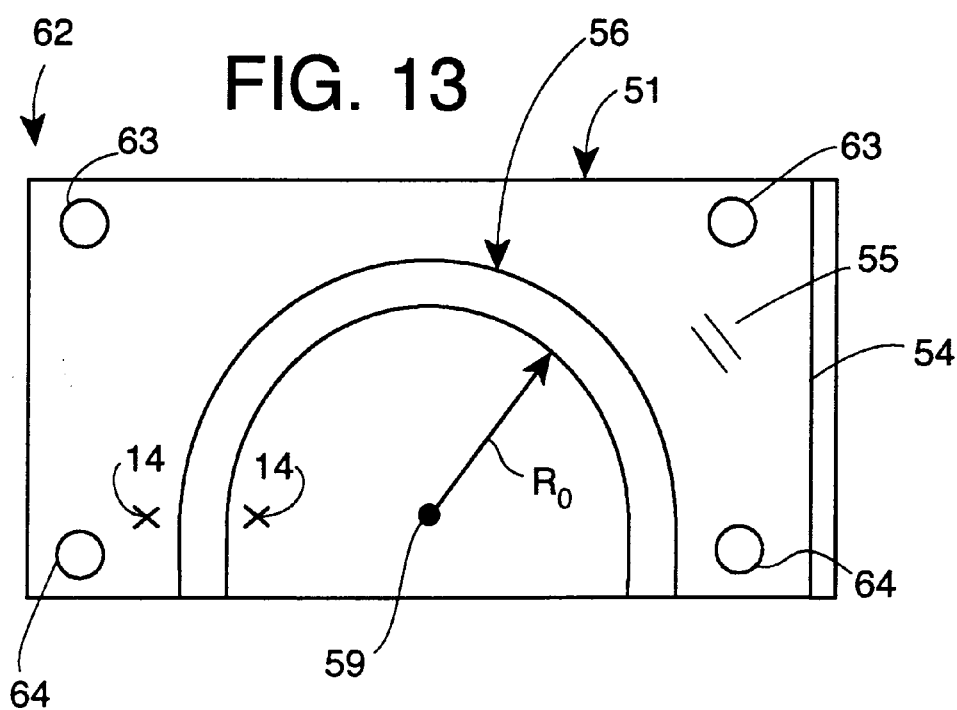

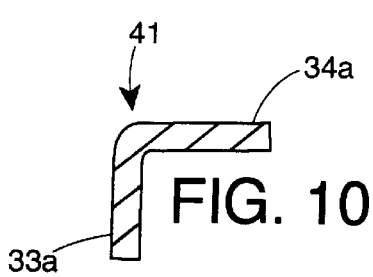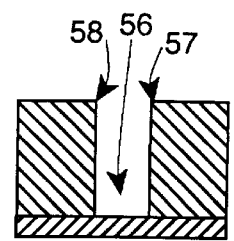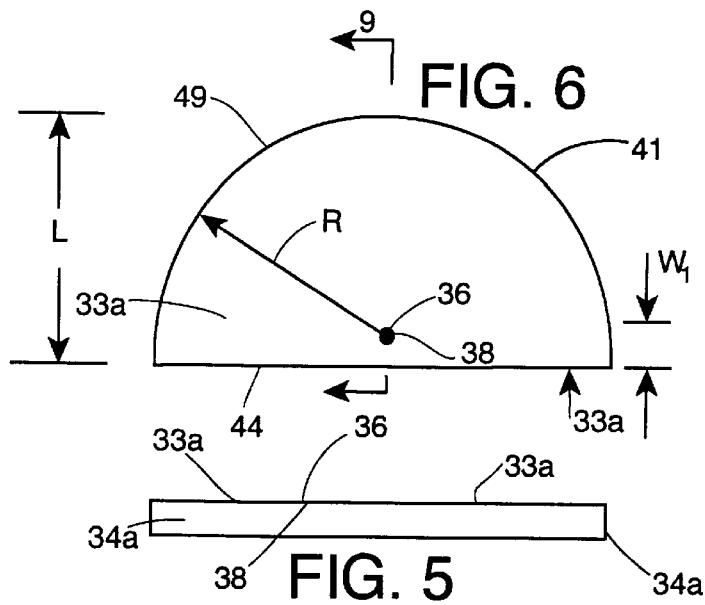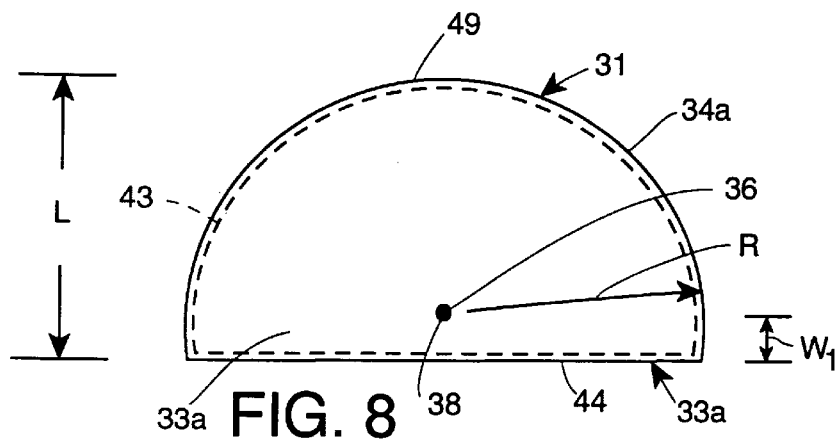

METHOD OF FORMING A METALIC INTERMEDIATE QUASI-HALF ANNULI, USEFUL IN ASSOCIATION WITH FORMING A FULL ANNULUS ABOUT INSULATED PIPES AND RELATED EQUIPMENT

The present invention relates to intermediate formed, quasi-half annuli and formation method therefor useful in constructing a full annulus thereof and more particularly to such quasi-half annuli each having an integral arcuate curved corner between its end and side wall that results from a stamping operation that first cuts and then folds the blank material relative to the corner, say during a single active stroke of a punch plate relative to a die plate of a stamping machine. After the return stroke of the punch plate has opened the fixture, the completed quasi-half annulus is cleared from the fixture and the process repeated. That is to say, the combination of active and return strokes of the punch plate provides for formation of the quasi-half annulus of the invention from a blank of metal. After at least a pair of quasi-half annuli have been manufactured, easy assembly thereof to form the completed metallic full annulus, can easily occur at the work site usually at the end of insulated pipe of a piping assembly or the like. That is, each such full annulus is composed of a pair of quasi-half annuli united along a longitudinal plane through the completed annulus, such plane intersecting the longitudinal axis of symmetry as well as bisecting the end and side wall thereof.

DEFINITION

In this application, the term "quasi-half annulus" refers to 3-dimensional figure that includes an arcuate side wall defined by a common radius originating along a common longitudinal line of formation parallel to the side wall, an end wall connected to the side wall intersecting the line of formation, and an integrally formed corner uniting the end wall and side wall wherein the side wall defines a rectangular opening parallel to the line of formation and an arcuate opening normal to the line of formation at an end opposite to the end wall. The rectangular opening is offset to one side of the line of formation in a direction opposite to the side wall so that the area of the side wall and end wall is slightly greater that a conventional half annulus having a semi-circular, end wall but being open at the other end.

BACKGROUND OF THE INVENTION

In order to conserve energy, Federal and State commercial and residential codes and regulations specify efficiency standards, included in these standards for piping, duct and associated equipment are insulation efficiency values. Insulation type, dimensions, hardware etc., can be specified. In addition, there is a need to protect all end edges of the insulation circumferentially projecting around such piping and associated equipment, usually by metallic caps.

As far as I am aware, most metallic caps for use in the aforementioned applications, are individually crafted, by conventional cutting, rolling and crimping techniques. While there has been some attempt to use factory fabrication methods, experience has shown that the side wall and top wall of such caps are still individually constructed in sequence and then united along full circumferential connection equi-spaced from the longitudinal axis of symmetry thereof, viz., to the circumferential extending termini of the top and side wall. Because of haphazard dimensional restrictions, there is required a doubled wall-overlap crimping arrangement ("Pittsburgh Seam") to unit the walls. Thus, such caps are expensive and because of dimensional instability, are subject to a need to continually retrofit the finished caps until a good fit occurs at the work site, all costly and time consuming operations.

SUMMARY OF THE INVENTION

The invention provides for an intermediately formed quasi-half metallic annulus useful in constructing a full metallic annulus that can be mounted at the ends of insulated pipes and like equipment for weatherproofing purposes. Each quasi-half annulus includes (a) an arcuate side wall defined by a common radius originating along a longitudinal line of formation parallel to the side wall, (b) an end wall connected at one end of the side wall, (c) the side and end wall including an integrally formed corner for uniting them wherein the side wall has a rectangular opening parallel to the lien of formation and an arcuate opening normal to the line of formation at an end opposite to the end wall. The rectangular opening is offset to a side of the line of formation in a direction opposite to the position of the side wall so that the combined area of the side and end walls is slightly greater that a conventional half annulus of similar shape and dimensions. Due to the invention, the side and/or end openings are also flexibly workable to permit entry within or without mating side and/or end openings of an another intermediate quasi-half annulus of similar construction. (This feature of the invention is called a "bisexual" attribute since either one of the pair of quasi-half annulus can be a "male" member or a "female" member after attachment occurs.) Result: a full annulus united along a U-shaped overlap region of common transverse and circumferential length W is easily formed at a work site, say for covering over an open side of insulation layered about pipes and associated equipment to protect same against fluid intrusion. A method of formation and usage is also described.

BRIEF DESCRIPTION OF DRAWINGS

FIG. 1 is a perspective view of an insulated stub threaded to an end of a pipe to which is attached a completed full annulus of the invention;

FIG. 2 is a section taken along line 2—2 of FIG. 1 illustrating, inter alia, that the full annulus is composed of a pair of quasi-half annuli;

FIG. 3 is an enlarged detail taken along 3—3 of FIG. 2;

FIG. 4 is a perspective exploded view of the pair of quasi-half annuli of FIG. 2 removed from contact with stub and pipe of FIG. 1;

FIG. 5 is a top view of one of the pair of quasi-half annuli of FIG. 4;

FIG. 6 is a front view of the quasi-half annulus of FIG. 5;

FIG. 7 is a bottom view of the quasi-half annulus of FIG. 6;

FIG. 8 is a rear view of the quasi-half annulus of FIG. 5;

FIG. 9 is a section taken along line 9—9 of FIG. 6;

FIG. 10 is an enlarged detail taken along line 10—10 of FIG. 9;

FIG. 13 is a detail top view of the die plate of the fixture of FIG. 11;

FIG. 14 is a section taken along line 14—14 of FIG. 13.

DETAILED DESCRIPTION OF THE INVENTION

Figure 11:
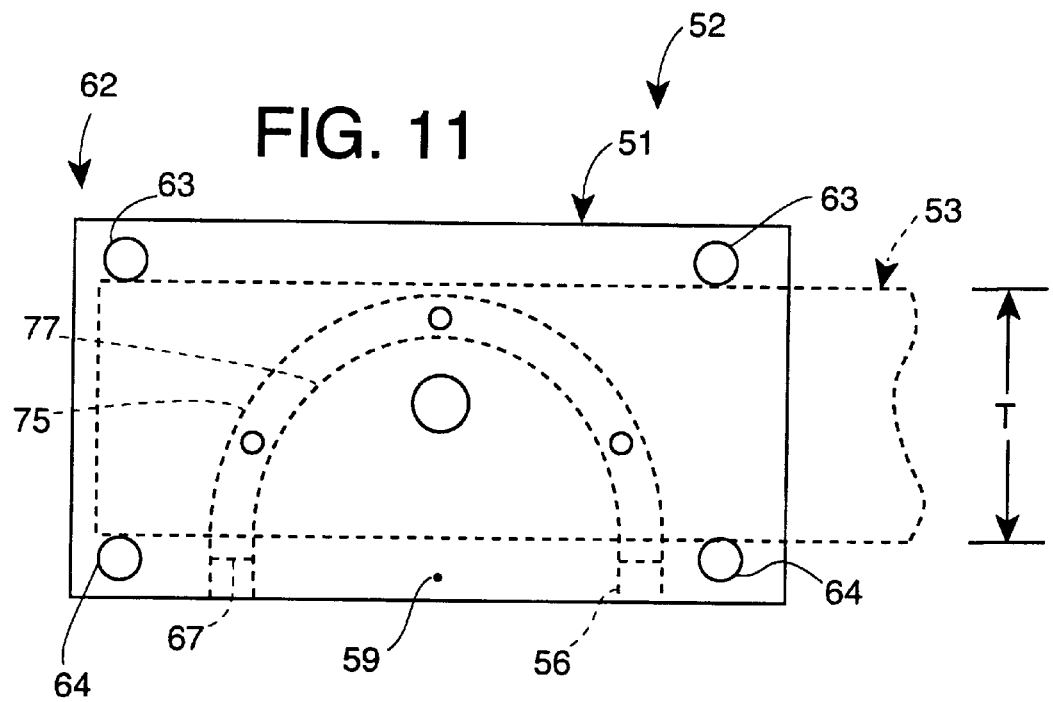
FIG. 11 is a top view of a fixture used in the method of the invention to produce the quasi-half annulus of FIG. 5.

As shown in FIGS. 1–3, a pipe stub 10 is attached to a pipe end 11 of a pipe 12. The stub 10 includes a side wall 13 having an inner surface 14, and outer surface 15 and a end wall 16 normal to longitudinal axis of symmetry 17. Opposite to end wall 16 is a series of threads 18 at the inner surface 14 of the stub 10. The threads 18 engage like-threads 19 at exterior surface 20 of pipe 12. The pipe 12 includes side wall 22 defining an axis of symmetry coincident with the axis of symmetry 17 of the pipe stub 10.

Insulation 25 is rectangular in cross section and has an inner broad surface 26 that is rolled about the pipe stub 10 and the pipe 12 and then secured to pipe stub 10 and the pipe 12, respectively, via a jacket 27. Thus, the insulation 25 takes the shape of pipe stub 10 and the pipe 12, i.e. cylindrical. Side surface 28 of the insulation 25 is then trimmed in a plane normal through the axis of symmetry 17 of the pipe stub 10 parallel to the end wall 16 to which is secured a full metallic annulus 30 formed in accordance with the invention, such attachment being via say a series of fasteners one of which is shown at 81.

Metallic annulus 30 is composed of a pair of quasi-half annuli 31, 32 matched in shape at formation but united in use, along a flexibly U-shaped overlap region 35 (in cross section) bisected by a longitudinal plane P, such plane P being coincident with the longitudinal axis of symmetry 17 as well as bisecting combined end wall 33 and combined side wall 34 of the full annulus 30. The flexible U-shaped overlap region 35 has a parameter Po approximately equal to 2 H+2 R where H is the height of the side wall 33 and R is the outside radius of the side wall 34.

Note in FIG. 3 that the overlap region 35 includes identically shaped raised punch marks or dots 36 coincident with the axis of symmetry 17. This allows easy assembly as described in more detail below.

FIGS. 4–10 show the quasi-half annuli 31, 32 that comprise the full annulus 30, in more detail. Since the quasi-half annuli 31, 32 are the same, a description of one fits the other. Hence, although the description below related specifically to annuli 31, note that the same is equally relevant and applicable to annuli 32.

As shown the quasi-half annulus 31 includes an arcuate side wall 34a defined by a common radius R originating along longitudinal line of formation 38. Note that the line of formation 38 is parallel to the side wall 34a. An end wall 33a is connected at the side wall 34a. The end wall 33a is also seen to intersect the line of formation 38. The side wall 34a and the end wall 33a also include an integrally formed arcuate corner 41 that unites them.

Due to the arcuate shape of the side wall 34a, a rectangular opening 42 shown in dotted line in FIG. 8, is provided that is parallel to the line of formation 38 as well as an arcuate opening 43 shown in dotted line in FIG. 6. The arcuate opening 43 is seen to be normal to the line of formation 38 and is positioned opposite to the end wall 33a.

Positionwise, the rectangular opening 42 is offset to one side of the line of formation 38 at the termination of the side wall 34a. Result: the combined area of the side wall 34a and the end wall 33a is slightly greater than that of a conventional half annulus of similar shape and dimensions.

In operations as explained in more detail below, the rectangular opening 42 and/or arcuate opening 43 of the quasi-half annulus 31 are also flexibly workable to permit entry within or without the other intermediate quasi-half annulus 32 so as to form the full annulus 30 as shown in FIGS. 1–4. Note in this regard, that unification of the quasi-half annuli 31, 32 is along the U-shaped overlap region 35 of common transverse and circumferential length W, previously mentioned.

As shown, the U-shaped overlap region 35 is described as being defined by transverse and circumferential width W because such width W is transverse to the axis of symmetry 17 relative to the end wall 33 as shown in FIG. 1 but is also circumferential extending relative to the side wall 34.

Returning to FIG. 4, assume that Wi is the transverse or circumferential distance measured from the line of formation 38 to a termination point associated with the following: at end surface 44 of the end wall 33a or at end surface 45 of the side wall 34a of the quasi-half annulus 31. Note in FIG. 9 that the raised punch mark or dot 36 is coincident with the line of formation 38.

As shown in FIG. 3, the raised punch marks or dots 36 associated with the half-quasi annuli 31, 32 become axially aligned relative to each other after assembly. That is to say, the dot 36 of the quasi-half annulus 31 is axially stacked adjacent to the dot 36 of the quasi-half annulus 32. Thus, width W of the overlap region 35 is equal to $$2\,W1$$

where W1 is the transverse distance from the raised dot 36 to the end surface 44 of the end wall 33a associated with quasi-half annuli 31, 32 or to end surface 45 of the side wall 34a associated with the quasi-half annuli 31, 32, see FIG. 4.

Additionally, a maximum chord length L of the end wall 33a is seen to FIGS. 6 and 8 is also defined at the end wall 33a. It is measured from the outside surface 49 of side wall 34a through the line of formation 38 and terminates at end surface 44 of the end wall 33a and is equal $$R+Wi$$

and R is the outside radius of the side wall 34a and Wi is the transverse distance from raised dot 36 to the end surface 44 of the end wall 33a.

FIGS. 11–14 show a fixture 52 of producing—in sequence—the pair of quasi-half annuli 31, 32 of FIG. 4.

As shown, the fixture 52 comprises a die plate 50 and punch plate 51. A coil of feed blank 53 of metal is fed to the fixture 52 for providing a succession of quasi-half annuli 31, 32 illustrated in FIG. 4 on a systematic basis. In this regard, note that the feed blank 53 has already been trimmed in the transverse direction indicated by arrow T to provide a chord length that is slightly greater than the chord length L for the finished quasi-half annulus 31 or 32. The feed blank 53 is seen to be a rather thin gauge metal such as aluminum and to include a thickness t which is in a range of 0.01 to 0.024 inches.

As shown in FIG. 13, the die plate 50 includes a planar support 54 having a broad surface 55 on which an annular groove 56 is formed. The annular groove 56 includes a rolling edge 57 and a cutting edge 58. A center of formation 59 is located relative to the groove 56 and defines a radius Ro (where Ro is equal to R+t) extending from the center of formation 59 to rolling edge 57. A pick punch 61 is seen to be located at the center of formation 59, see FIG. 12.

Figure 12:
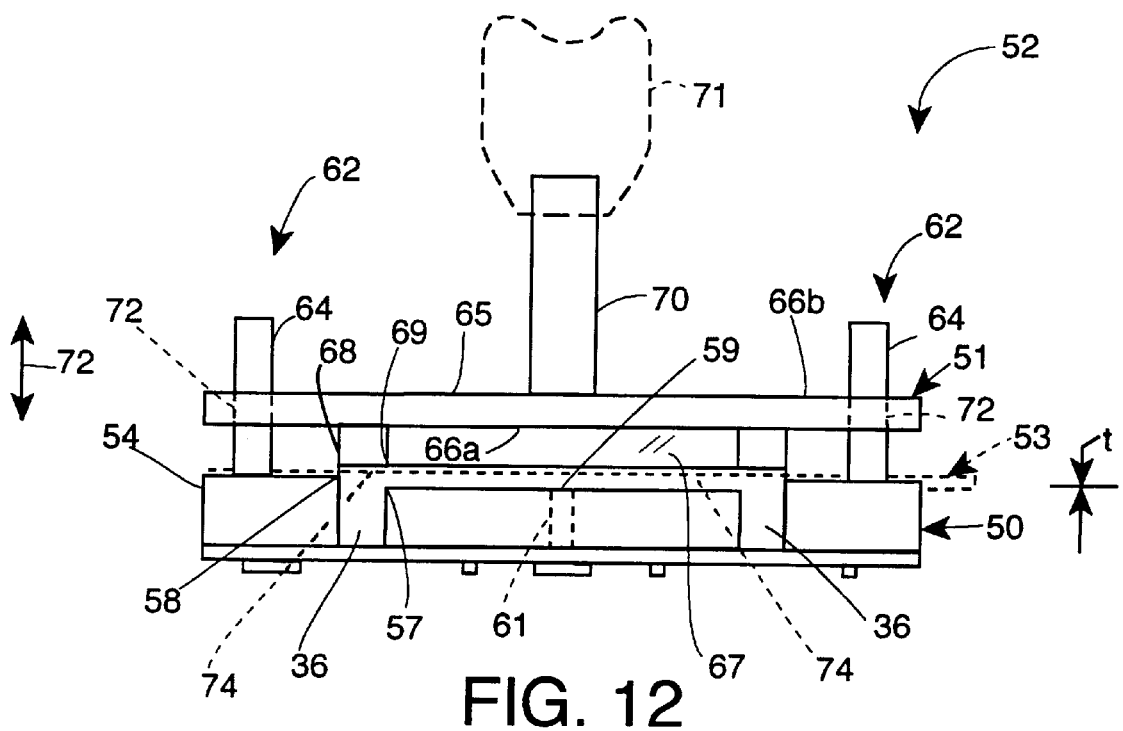
FIG. 12 is a front view of the fixture of FIG. 11.

As shown in FIG. 11 and 12, a guide assembly 62 attached to the planar support 54 and includes two sets of cylindrical guides 63 and 64 that protrude therefrom as shown. The set of guides 63, 64 not only position the feed bland 53 relative to the die plate 50 and punch plate 51 but to also guide the movement of punch plate 51 relative to the die plate 50.

The punch plate 51 includes a planar support 65 supported above the die plate 50 having undersurface 68a that includes an annular ridge 67 designed to mate with the arcuate groove 56. The shape and dimensions of the ridge 67 allow for cutting at cutting corner 68 and folding at folding corner 69 as explained in detail below. External broad surface 66b of the planar support 65 is seen to include a shaft 70 attached to a driver mechanism 71 of say a stamping machine, not shown, that provides rectilinear movement of the punch plate 51 in the direction of arrow 72. During such movement (usually parallel to the earth's gravitational field), guide holes 72 in the punch plate 51 permit penetration by the set of guides 63 to direct the punch plate 51 in the correct path into contact with the feed bland 53 to form the quasi-half annulus 31 or 32 in the following manner.

First, the feed blank 53 is positioned within the fixture 52 between the die plate 50 and punch plate 51 in an open position. Then the punch plate 51 is activated via the drive mechanism 71 to close the fixture 52 to initiate the activation stroke thereof. Result: the angular ridge 67 of the punch plate 51 is brought into cutting contact the feed blank 53 along an imaginary arcuate cut line indicated at 75 in FIG. 11 on the feed blank 53 normalized relative to center of formation 59 and thereafter into folding contact via an arcuate fold line indicated at 77, both cut line 75 and fold line 77 being positioned above the arcuate groove 56 of the die plate 50, see FIG. 12. Because of the shape of the annular ridge 67 and annular groove 56, cutting of the feed blank 53 first occurs at cutting edge 58 and cutting corner 68 of the fixture 52 before a resulting trimmed blank edge of the feed blank 53 is folded ("crimped") about the rolling edge 57 and folding corner 69 of the fixture 52. The direction of such folding of such edge region is shown by phantom line 74. Thereafter, the drive mechanism 71 causes the fixture 52 to return to its open position during a return stroke so that the resulting formed quasi-half annulus 31 or 32 can be removed. Then the method is repeated to provide the mating quasi-half annulus 32 or 31 in similar manner. After deburring edges, the quasi-half annuli 31, 32 are provided with openings 80, see FIG. 4, through which fasteners 81, see FIG. 1 extend to not only unite the quasi-half annuli 31, 32 but attach the resulting full annulus 30 relative to the jacket 27 of the insulated pipe 12.

To recap, the method of the present invention include the steps of:

(a) placing feed blank 53 of metal in stamping fixture 52 comprising a planar die plate 50 and a planar punch plate 51, (b) activating the punch plate 51 to initially cut the blank 53 along arcuate cut line 75 normalized to center of formation 59 centered at the fixture 52 and then folding the cut blank along second arcuate fold line 77 offset interior of the cut line 75 to form integrally formed arcuate corner 41 (see FIG. 10) wherein the intermediate quasi-half metallic annulus 31 or 32 is completely formed.

Thereafter the formed quasi-half metallic annuli 31, 32 are mounted about or at the end of an insulated pipe by flexibly working the openings 42, 43 of say quasi-half annulus 31 to permit its entry within or without the other intermediate quasi-half annulus 32 so as to form the full annulus 30 as shown in FIG. 1 in weather-proofing protection of insulated pipe 12. Note in this regard, that unification of the quasi-half annuli 31, 32 is along the U-shaped overlap region 35 of common transverse and circumferential length W, previously mentioned.

I claim:

1. A method of forming a metallic intermediate quasi-half annulus useful in constructing a metallic full annulus comprising a side wall concentric about a longitudinal axis of symmetry and an end wall through which said axis of symmetry extends, comprising the steps of (a) placing a blank of metal in a stamping fixture comprising a planar die plate and a planar punch plate, (b) activating the punch plate to cause movement thereof into contact with the blank of metal atop the die plate wherein the blank is cut along an arcuate cut line beginning and ending at a side of the blank to create an offset edge region atop an actuate groove in the die plate and then the offset edge region of the blank is folded along a second arcuate fold line of similar shape to the cut line but offset interior thereof to form a corner between end and side walls of a metallic intermediate quasi-half annulus, said metallic intermediate quasi-half annulus comprising an arcuate side wall depending from said corner defined by a common radius originating along a longitudinal line of formation parallel to said side wall, an end wall also depending from said corner intersecting said line of formation, said corner uniting said end wall and said side wall along said second arcuate fold line wherein said side wall has a rectangular opening parallel to but offset to one side of said line of formation and an arcuate opening normal to said line of formation at an end opposite to said end wall, so that the combined area of said side wall and end wall is slightly greater than that of a conventional half annulus having a semi-circular end wall at one end and being open at the other end, said side and end openings also being flexibly workable to permit entry within or without mating openings of an another metallic intermediate quasi-half annulus of similar construction so as to form a metallic full annulus united along a U-shaped overlap region of common transverse and circumferential length W and being highly useful in covering over an open side of insulation layered about pipes and associated equipment to protect same against fluid intrusion.

2. The method of claim 1 in which said metallic intermediate quasi-half annulus is formed from a thin gauge metal of thickness t.

3. The method of claim 2 in which said thickness t of said metallic intermediate quasi-half annulus is in a range of 0.01 to 0.024 inches.

4. The method of claim 3 in which said metallic intermediate quasi-half annulus is aluminum.

5. The method of claim 1 with the additional step (c) of mounting the metallic intermediate quasi-half annuli about an end of insulated pipe, stub and the like by flexibly working the rectangular opening and/or arcuate opening of the metallic intermediate quasi-half annulus relative to the mating openings of the other metallic intermediate quasi-half annulus so as to form a full annulus about the aforementioned end.

6. The method of claim 5 wherein step (c) is further characterized by formation of said U-shaped overlap region of common transverse and circumferential length W associated with said full annulus.

7. The method of claim 5 with the additional step of (d) attaching said metallic intermediate quasi-half annuli together to form said full annulus using fasteners penetrating said U-shaped region of said metallic intermediate quasi-half annuli and said insulation.

\* \* \* \* \*